April 4, 1961  R. A. WINKLER  2,977,844
EQUIPMENT FOR PRODUCING PANORAMIC PICTURES
Filed March 28, 1957  3 Sheets-Sheet 1
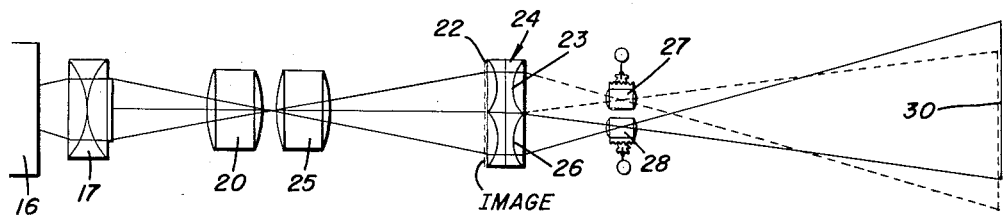
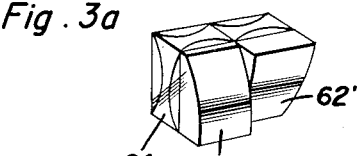
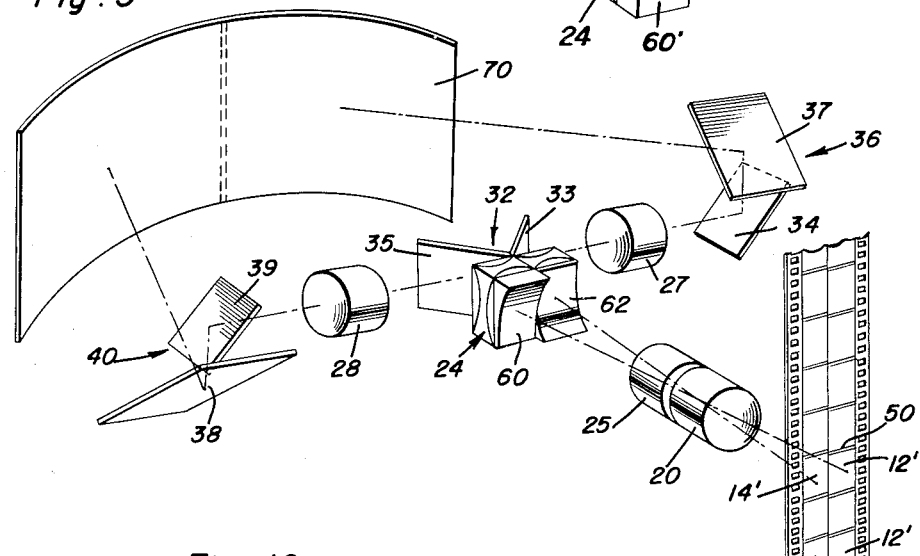
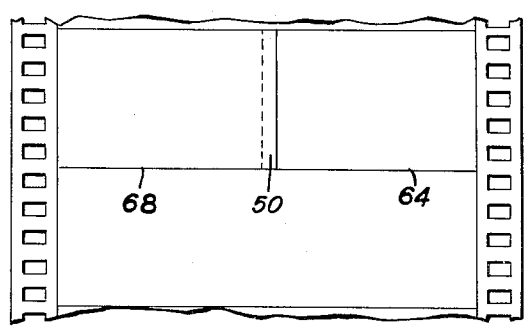
Robert A. Winkler
INVENTOR.
BY *Clarence A. O'Brien and Harvey B. Jacobson*
Attorneys

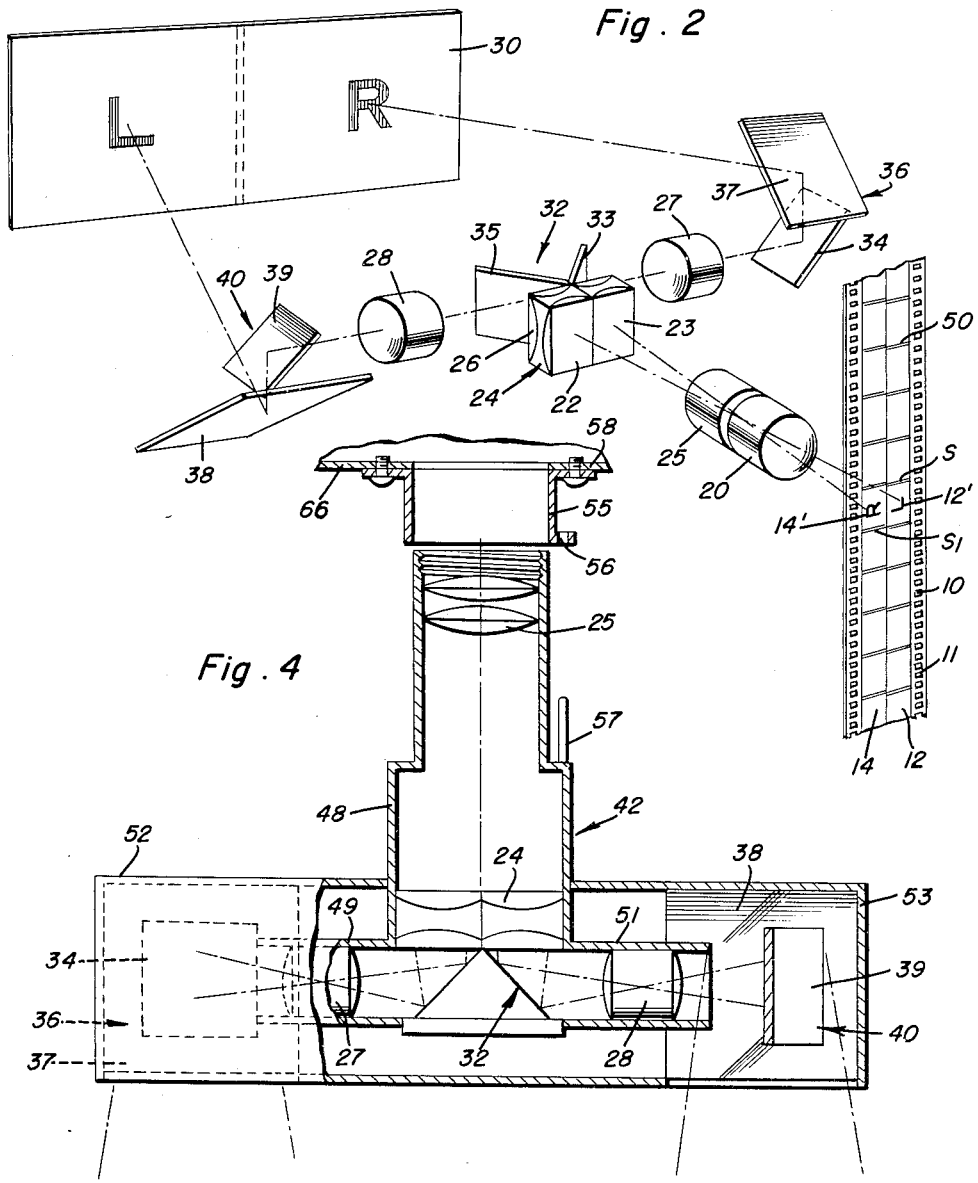

April 4, 1961   R. A. WINKLER   2,977,844
EQUIPMENT FOR PRODUCING PANORAMIC PICTURES
Filed March 28, 1957   3 Sheets-Sheet 3

SCREEN

Robert A. Winkler
INVENTOR.

BY *Clarence A. O'Brien*
*and Harvey B. Jacobson*
Attorneys

United States Patent Office 2,977,844
Patented Apr. 4, 1961

2,977,844

EQUIPMENT FOR PRODUCING PANORAMIC PICTURES

Robert A. Winkler, 402 E. Huston St., New York, N.Y.

Filed Mar. 28, 1957, Ser. No. 649,058

2 Claims. (Cl. 88—16.6)

This invention relates to means for taking and projecting panoramic pictures, suitable for wide angle screens covering a viewing angle up to about 180°. The invention has for its main object to produce such panoramic pictures, using a single standard film produced by means of a single standard camera, which film may be projected onto the screen by a single conventional standard projector, the camera and the projector being only provided with relatively simple additional equipment which may adopt the form of an attachment capable of being mounted on the camera or projector without much difficulty.

It is well known that panoramic films projected on a wide angle screen covering a viewing angle of between 120° to 180° produce an impression of reality which is by far superior to and more convincing than any picture produced on a conventional flat or curved screen. Several methods have therefore been developed and have actually been introduced into practice permitting such an improved impression of reality. A widely used method obtains the desired result by means of panoramic projection pictures made by using three synchronized picture taking cameras, each camera producing a film, the three films thus obtained containing simultaneously taken pictures of identical scenes which are afterwards projected by means of three synchronized projectors in such a manner that they form a single panoramic projection picture.

On account of the disadvantages associated with panoramic pictures and with the simultaneous handling of three accurately synchronized cameras and projectors other methods have been proposed using only a single film made by means of a single camera. These methods however have to use very special and complex picture taking or projection equipment, such for instance as a curved film gate holding the film in a curved position during projection, a method which also has some inherent disadvantages and moreover does not produce an angle as wide as the above described method so that the impression of reality is not obtained to the same extent.

Other methods operating with a single film use anamorphosis and therefore necessitate the use of special optical camera and projector equipment. These methods moreover do not produce a sufficiently wide angle of the projection picture if conditions with respect to sharp definition are met so that the impression of reality produced by composite pictures cannot be obtained. Such pictures also frequently change the height to width ratio of the projection picture considerably.

Methods for producing plural additive pictures have moreover been developed for stereoscopic and color film projection in which a plurality of projection pictures (such for instance as color separation pictures) are projected simultaneously or successively by splitting the projection beam or by using fractionated projection lenses. Such beam splitters or fractionated lenses are however of poor efficiency and of poor relative aperture, due to the fact that a lens takes in and focuses all rays which reach its surface and that therefore the limiting of the activity of the lens solely to the rays passing through one picture frame, if a plurality of such picture frames is simultaneously illuminated, limits the size and aperture of the lens markedly.

The invention provides a new method and means for producing panoramic projection pictures which can be carried into effect by means of a single film and which, during the taking of pictures as well as during the projection of the same, requires only the addition of an easily attachable and easily detachable attachment to a standard camera and a standard projector. Nevertheless, by means of the method according to the invention panoramic pictures covering a viewing angle of any desired size up to around 180° can be produced on a flat as well as on a curved screen.

The invention is essentially based on the fact that a panoramic projection picture can be obtained by means of two sectional pictures of sufficient width, each covering substantially one-half of the object or scene, which are juxtaposed on a standard film, which pictures may be obtained by simultaneous exposure in a camera; these pictures are then projected simultaneously on the screen by means of a single standard size projector without splitting the projection beam during its passage through the projection lens. The two pictures which join form part of two series of frames, successive projection of which produces the motion picture. The frames of the two series are so placed on the film and so positioned that the longer dimension or width of each frame coincides with the length dimension of the film which is also the direction of movement of the same, while the combined height of the two frames which produce the composite projection picture is substantially equal to the width of a standard film. This position permits the juxtaposition of two series of frames having any desired height to width ratio.

The two sectional juxtaposed pictures which form one projection picture thus occupy a position on the film which is at right angles to the correct position for projection. Therefore, the picture must be turned around through 90° during projection.

While the juxtaposition of simultaneously projected pictures on a film is known in itself and has been used in connection with stereoscopic pictures using beam splitting or fractionated projection lens systems, the essence of the invention consists in providing a projection method which uses a standard projection lens. The standard projection lens, by means of an additional suitable optical lens system shortening its focal distance, produces a real (aerial) image of the two juxtaposed picture frames in the focal plane of the combined lens system which real image now appears on the planar surface of a further optical system which consists of a twin or dual lens system. The dual lens system is arranged in such a way that each of its two lenses or lens systems just receives and reproduces the real image of one of the two juxtaposed frames. The bisection of the complete image can be accomplished without difficulty in a case in which the object is itself an image. The aerial image of the two juxtaposed frames is divided by the two lenses of the dual lens system into two ray pencils which, by means of a mirror or prism system are deflected in a transverse direction towards two secondary projection lenses which project the two pictures on the screen essentially in juxtaposition.

As panoramic wide angle screens are frequently curved screens it is also part of the essence of the invention to provide a method and means for the projection of such projection pictures on a curved screen. Obviously, if a normal projection lens system is used a projection picture of sharp definition is to be found in a focal plane and a curved screen therefore shows a sharp definition of the screen picture solely near its intersection with the focal plane of the projector. According to the invention, however, the object, the picture of which is actually projected, is not the frame on the film, but is in fact only a real (aerial) image of the frame made by the projection lens in conjunction with the additional lens system. It is possible to produce curved real images of the frames appearing in the film gate by the addition of cylindrical lenses which, on account of the fact that the real image consists of two sections each of which cooperates with a section of a dual lens system, is preferably a cylindrical lens section which the rays have to pass before they reach the dual lens system. These cylindrical fractional lenses produce a curved real (aerial) image which now extends along a curved surface instead of extending in a plane. A suitable selection of the curvature of the surface holding this real image which forms the "object" of the dual lens system produces a sharply defined picture on a curved projection screen if the curvature of the image conforms itself to the curvature of the screen.

The curving of this real or aerial image introduces, as will be understood, a distortion into the picture which is due to the cylindrical lens producing the curvature and therefore according to the invention, a correction must be provided which is introduced by taking the picture with an identical equipment. This equipment, produces a distortion of the picture taken on the sensitized film which distortion, by virtue of the distortion introduced during projection, is exactly corrected in the projected picture and is thus not noticeable to the viewer of the screen.

A further important feature of the invention consists in the method and means for avoiding the irritation due to accidental relative movements by separation of the two pictures the simultaneous projection of which produces the full width composite projection picture.

To avoid relative movement of the projection picture sections the frames on the film are arranged in the same direction so that the top of both juxtaposed pictures as well as their bottom face towards the same direction. Likewise the sides of the frames showing the right side of the original as well as those showing the left side of the original face towards the same direction. Accidental vibrating or other movements of the film during the simultaneous projection of the two sectional frames forming the single composite projection picture thus always occur in the same direction so that the projection picture sections never separate or show any independent or differential movement. Further, as a direct abutment of the projection pictures can not be presumed to be absolutely perfect without occasional separation which would lead to occasional disturbing light flashes or the formation of dark spots, the two frames on the film which form the composite picture are slightly larger than a half section of the picture, the two extensions forming a narrow strip which shows identical picture sections. In addition, however these strips are also provided with a grey wedge of increasing opacity towards the outer margin of the strip-like extension reducing illumination of the said strip-like extension by the projection lamp gradually.

The strip-like extensions carrying identical picture sections overlap when the composite picture is made on the screen and although illuminated approximately with a double intensity they will appear only to be illuminated in the same way as the remainder of the picture surface by virtue of the overlapping grey wedges the opacity of which increases and decreases in opposite directions. As the illumination reducing grey wedges of the two pictures in the overlapping strip section produce a gradual toning down of the illumination of exactly opposite sign, the illumination of the strip in a composite picture on the screen will be approximately uniform and will be in conformity with the illumination on the remainder of the screen surface. The pictures projected, likewise, are identical being essentially taken by a single lens so that the zone of junction of the fractional or sectional pictures will not be noticeable to the viewer.

Summarizing the main objects of the invention it may be stated that the principal object consists in providing a method and means which permit to make a panoramic projection picture from component pictures projected simultaneously by a single projection lens from a film on which the said component pictures are aligned in a plurality of series, each covering only part of a standard frame in a manner which permits, after passage of the beam through the projection lens, to collect into separate beams all the rays and solely the rays which emanate from each of the component frames containing one of the component pictures and to place these component pictures on the screen in correct relationship without any loss of light.

Another of the main objects of the invention consists in a method which, in addition, permits to produce a projection picture on a curved screen with maximum definition.

A further main object of the invention consists in a method and means permitting overlapping of the projection picture without substantial change in the illumination of the overlapping portions.

In addition to the main objects of the invention realized by the use of new principles a number of other important objects will be apparent from the following detailed specification.

The invention is illustrated diagrammatically in the accompanying drawings which show several modifications of the method and means according to the invention. It is however to be understood that the diagrammatic illustration in the drawing intends essentially to facilitate the explanation of the principle of the invention and of the best modes of applying said principle. The drawings do not show constructional details and do not give a survey of all the variations or modifications which will be obvious to those understanding the principle of the invention, and a departure from the illustrated means is therefore not necessarily a departure from the principle of the invention.

In the drawings:

Figure 1 is a diagram illustrating the principle of the invention in a simplified form.

Figure 2 is a perspective diagram illustrating the formation of a panoramic projection picture by means of the method according to the invention, the example illustrated being that of producing a panoramic picture on a flat screen.

Figure 3 is a diagram similar to Figure 2 illustrating the production of a panoramic picture on a curved screen.

Figure 3a is a perspective view of a lens assembly diagrammatically illustrating a modification of one of the lens systems forming part of the system illustrated in Figure 3.

Figure 4 is a diagrammatic illustration of an assembly containing the elements of the system illustrated in Figure 2, 3 or 3a which are added to the standard projection apparatus, said assembly forming a unitary structure capable of being mounted on a projector or a camera as an attachment.

Figure 10 is a diagram illustrating the making of two panoramic sectional pictures by means of a film of larger than standard width.

The method according to the invention may be explained with reference to Figures 1 and 2 of the drawings which illustrate diagrammatically the simplest form of the invention using a flat projection screen of suitable dimensions.

As has been mentioned above the method according to the invention may be carried out with any projector and any camera, for instance by means of a standard projector operating in conjunction with a standard 35 mm. film, but any other type of film and projector such as a projector for 16 mm. film or for wide films may be used. To produce panoramic projection pictures on the screen a plurality of frames is arranged on the same standard film in juxtaposition and in order to utilize the available space fully the frames are preferably so juxtaposed on the film that their longer dimension is arranged in the direction of the length dimension of the film.

Figure 7:
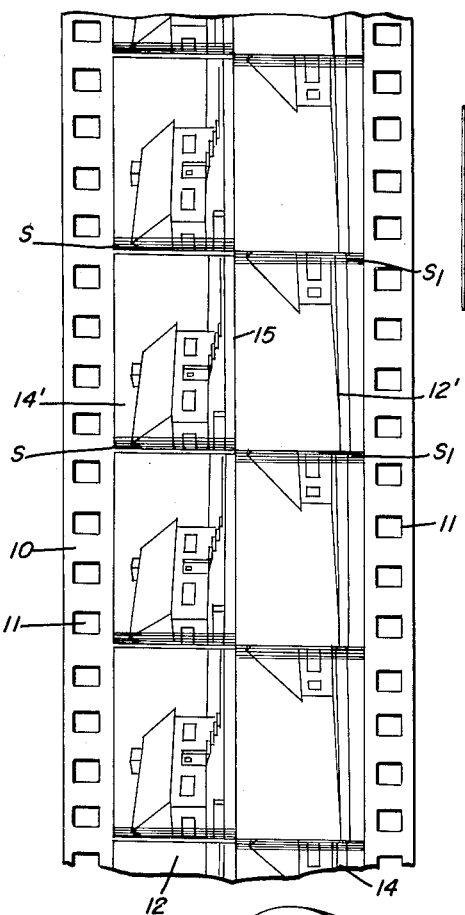
Figure 7 shows in elevation a fragment of the film carrying the two series of frames which when projected simultaneously form the panoramic picture.
Figure 8:
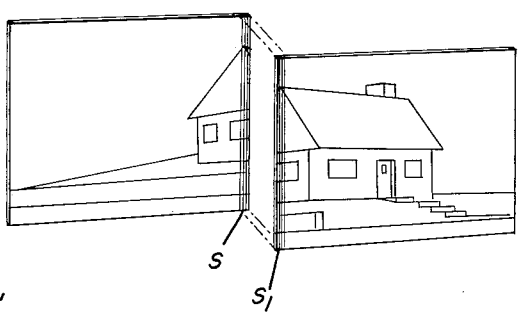
Figure 8 is a perspective diagram showing the overlapping of two sectional pictures which pictures are however shown at a distance the overlapping being indicated by dotted lines.

A standard film 10 is shown in Figure 7 which is provided with the customary perforations 11 and which is distinguished from the conventional standard 35 mm. film only by the fact that it carries two series of frames 12, 14 each series covering one-half of the width of the film 10 lengthwise. Each series consists of frames aligned along the longer dimension.

Two juxtaposed frames 12' and 14' of the series projected together produce one projected picture on the screen and they are therefore complementary insofar as each frame 12' or 14' contains roughly one-half of the total projection picture. In fact, each frame contains slightly more than one-half of the total picture, as will be explained below so that the two pictures when projected overlap slightly along a marginal zone $s, s_1$, and a special arrangement, described below, is provided to allow for such overlapping without impairing the quality of the projection picture.

The sides of all pictures in the series of frames 12, 14 point in the same direction; for instance, the top portions of the pictures point towards the left, the bottom portions towards the right, the left sides of the pictures taken are on the left side of the frame, the right sides of the picture on the right side of the frames and at the bottom and top in the figure, respectively. This arrangement has the special advantage of preventing relative displacement of the two halves of the projected picture.

Standard films of the type above described with two series of frames are known and are used to produce stereoscopic or color projection pictures; but the pictures in the frames are usually arranged symmetrically relatively to the dividing line between the series. However, while this arrangement may be suitable for stereoscopic pictures, it is of disadvantage in connection with panoramic screen pictures because small vibratory movements of the film in the projector which are unavoidable impart a kind of vibration to the projection pictures, usually not noticeable. These small movements become noticeable when the projection picture consists of two independently projected frames which move in a different direction, whereby the relative movement of the screen picture sections is magnified and is made conspicuous. With frames arranged in the manner shown in Figure 7 the projection picture sections always move in conjunction and the spectator does not receive an impression which differs from the picture made by a single frame.

Figure 1 illustrates the principle of the invention in its most simplified form. The projection lamp 16 and condenser 17 and the projection lens 20 are of the standard type and need not be described. In fact, only the optical equipment in front of the projection lens differs from or is an addition to the standard projector and it may therefore be added in the shape of an attachment as described below.

The standard projection lens which may be used when the assembly operates in the conventional manner, but may also be used in connection with the invention, would produce a projection picture on the screen 30 located at a selected distance as usual; it would however not produce a single picture but merely a picture of the two frames side by side. According to the invention, however, an additional lens 25 of a focal length approximately equal to that of lens 20 is arranged in front of the projection lens 20. This combined system produces a real (aerial) image of the two frames on the film in a plane 22 indicated in dotted lines in Figure 1. This real (aerial) image may for instance be formed on the flat rear surface of a dual lens system 24. This dual lens system must be so adjusted that in the aerial image 22 the dividing line between the frames, indicated at 15 in Figure 7, coincides with the dividing line 21 of the lenses of the dual lens system. The adjustment however is not critical as the dividing lines 15 between the picture frames form the top and bottom respectively of the projection picture.

It will be noted that it is the real (aerial) image which is divided in this case and that therefore the effect is different in quality from the effect, such as produced by a fractioned projection lens system arranged in front of a double series of frames.

The diagram shown in Figure 1 shows only a top view of a simplified system, the lateral spreading and the turning of the projection beams being not shown. It is however seen that the two sections of the real image in the plane 22 form the "objects" the picture of which is projected on the screen 30 by means of the lens systems 27, 28 which may be considered as the projection lenses of the system whose object is the aerial image. It is also seen that an exact division of the total frame (consisting of the two frames 12', 14' simultaneously appearing before the lamp 16) can be carried out in the plane of lens system 24, thus permitting an exact division of the image into halves.

The lenses 23, 26 of the dual lens assembly 24, each lens of which may act as a secondary condenser, direct the rays emanating from the real image 22 of the (multiple) total frame 12, 14 consisting of the two sectional frames 12' and 14' towards the secondary projection lenses 27, 28 in two ray pencils or beams, each beam emanating from the aerial image of one of the two sectional frames 12', 14'. The screen picture, according to Figure 1, shows a near superimposition of the two independent projections of the said aerial image sections, each image section being formed by the image of one of the sectional frames. The superimposition may be used, in connection with the polarized light, for producing stereoscopic pictures in a manner otherwise well known.

It will be noted that in contradistinction to all so-called beam splitting systems no light is lost. In the conventional beam splitting systems where fractionated or divided projection lenses are used, rays from that section of the frame which is not reproduced by the lens system cannot be included. All attempts to suppress these rays lead to a loss of light. Therefore, a fractioned projection lens shows poor efficiency and unwanted images. The method according to the invention causes theoretically no light loss and produces a neat and complete division of a multiple total frame into sections each of which encompasses just one of the sectional frames. The secondary projection lenses 27, 28 are preferably adjustable along their optical axes in order to produce a sharply defined picture on the screen 30 which is arranged at the normal distance from the projector.

As seen in Figure 2 the rays leaving the lenses 23, 26 of the dual system 24, acting as a secondary condenser, are divided by a mirror (or by a reflecting prism) system 32 which consists of two mirrors (or prisms) 33, 35 each one reflecting the collected rays passing through one of the lenses 23, 26 at substantially right angles to the original direction. The rays which have been deflected by the mirrors 33, 35 then pass the secondary projection lens systems 27, 28 which are preferably arranged between the said mirrors 33, 35 and two other mirror or prism systems 36, 40.

Each of the mirror or prism systems 36, 40 consists either of two mirrors 34, 37 or 38, 39 respectively, or of two Porro prisms or of roof prism combinations such as well known which produce a deflection of the rays at right angles to the rays reflected from the system 32 while at the same time turning the image through 90°. The pictures marked by letters R–L on the two frames 12', 14', the central rays of which are indicated in dotted lines after thus being turned through 90° and appear side by side on the screen, as indicated by the letters L–R on the screen.

Figure 2 shows how the two pictures corresponding to the frame sections 12', 14' are placed side by side on the screen 30 during projection, with the strip-like marginal zones $s$, $s_1$ overlapping in the center of the projected picture.

The ratio of width to height in a single frame of a standard 35 mm. film is approximately 1½:1. With each frame section according to the invention occupying one-half of the standard film width in the direction of its height the ratio width/height may remain the same. The combined projection pictures would thus show a width to height ratio of 3:1. Theoretically this figure would be too wide for a wide angle screen but in fact the ratio is somewhat smaller on account of the overlapping marginal portions and the composite picture on the screen will have a width to height ratio approximately equal to 2.6:1 which is the largest universally adopted width/height ratio for wide angle screens.

In order to produce a film such as shown at 10 in Figure 7 a camera with an optical equipment in front of the camera lens identical with or similar to that shown in Figure 2 is sufficient. The diagram in Figure 2 therefore also illustrates the taking of a picture in a camera, if it is assumed that the screen 30 is the object to be photographed while the film is provided with the sensitized surface held in the camera to take the picture.

Figure 4 illustrates diagrammatically the way in which the optical systems used in connection with Figure 2 may be fitted into an attachment to be fixed in front of the camera lens or in front of the projection lens. The means for adjusting the adjustable lenses are not illustrated in the diagram which merely outlines the construction. The front wall 66 of the projector or camera is provided with a sleeve 55 with flanges 58 screwed or otherwise fixed to the wall 66, provided with a position fixing lug 56. The attachment comprises a box-like casing 42 with a tubular piece 48 which fits into the sleeve 55 and is preferably supported by two supporting members 43 each of which is provided with a guide sleeve 44 (Figures 5 and 6) which are slidably held on rods 45 projecting either from the projector camera casing 46, 47 or from a board 59 attached to it. The central, stepped tubular portion 48 of the box-like casing 42 (Figure 4) carries a transverse box structure with two tubular connecting pieces 49, 51 projecting laterally from the central tubular portion 48. The connecting pieces 49, 51 lead to the deflector housings 52, 53 which may form part of a large frontal transverse box structure encasing said systems. The central tubular portion also carries a position fixing pin 57 which engages a bore in the lug 56.

As seen in Figure 4 the central portion 48 of the housing contains the lens indicated at 25 in Figure 2. Near the end of this central portion the dual lens system 24 is arranged; the transverse structure contains the mirror system 32. The lens systems 27 and 28 are preferably arranged in the tubular connecting pieces 49, 51 while the mirror systems or prisms 36 and 40 are located in the housings 52, 53 which are open in front.

The entire structure above described may be a unit such as diagrammatically illustrated in Figure 4. For the adjustment of the members and especially of the lens system, conventional means may be used throughout. Such adjustment means are especially provided in connection with the lens systems 27, 28 and with the lens system 25 in order to permit the focusing of the images. The adjustment of the mirror or prism systems for a given locality, for different distances of the object from the camera or of the projector from the screen may likewise be performed by well known adjustment means (not shown).

The two frames 12', 14' marked R–L forming one picture on the screen are so selected that their projection pictures slightly overlap as has been explained above. When printing the film grey wedges are used in these zones so that the overlapping zones $s$, $s_1$ along the margins are gradually increasing in opacity. During projection the two zones which overlap and which are indicated at $s$, $s_1$ are lighted from two sides by the two beams in contradistinction to the remaining areas which are only lighted by a single beam. In view of the fact that the opacity in both strips $s$, $s_1$ on the screen increases towards the margin a uniform transition zone is produced the opacity of which is so selected that the zone indicated at $s$, $s_1$ is illuminated practically in the same way in which the remainder of the screen surface is illuminated. The overlapping strips, the opacity of which increases gradually, prevent the zone of abutment of the two sections of the projection picture of being more conspicuous than other areas of the picture. It may be added that, as the two sections of the picture are carried on the same film, are projected by the same projection lens and are illuminated by the same projection lamp, no relative movement or differences other than those produced by the increased illumination occur under normal conditions. Any accidental relative movement which may be possible can only be of an order which is hardly detectable by the eye. Without such zones an imperfection in the mirror adjustment or a vibration of one of the mirrors would manifest itself in light flashes or dark streaks causing a disturbance in the center of the picture.

As well known it has been found that a wide angle screen which is curved produces an impression of realism of the picture giving the spectator, when suitably seated, the impression of being in the midst of the scene which is shown on the screen. The system which has been above described for a flat screen may also, with little changes, be adapted for curved screens.

The main problem to be solved in connection with curved screens consists in obtaining a sufficiently high definition of the projection picture and a visual correction of the angle of view. The picture is thrown on the projection screen by means of a projection lens which produces only a well defined picture in a focal plane. It will be clear that the definition of the picture will be insufficient in areas which are not coincident with said focal plane. If therefore a curved screen is used only a relatively narrow zone of the projection will be of sufficient definition; this will be the zone which is near the intersection of the focal plane with the curved screen. In order to obtain a high definition over the entire screen which is essentially a cylindrical surface special lens arrangement is used according to the invention which is illustrated in Figures 3 and 3a.

The general arrangement of the lens—mirror—or prism systems is the same as that shown in Figure 2 and those parts which are designated by the same reference letters in Figures 2 and 3 are identical with those already described. However, the two lenses of the dual lens system 24 are provided with two additional fractional cylindrical lenses 60, 62 each arranged in front of one of the lenses 23, 26 and these cylindrical lenses are so positioned and curved that the real (aerial) image ultimately produced is curved. The curvature in the two sections of the image forming the object of the two fractioned lens systems must be such that it is tangential to the plane in which the real (aerial) image would be formed in the absence of the cylindrical lenses and for this reason the cylindrical lens is a half lens. However, the line of tangential contact to this plane is at opposite ends of the two halves of the fractioned lens system 24, and for this reason the half lenses in front of lenses 23, 26 are reversed.

On account of the production of curved (half-cylindrical) aerial images by the fractional cylindrical lenses 60, 62 the projection picture when focused has a curvature along a cylindrical surface the curvature of which is determined by the cylindrical fractional lenses 60, 62 respectively. A suitable selection of the latter thus places the projection picture on a cylindrical screen with maximum or near maximum definition.

The two additional cylindrical lenses 60, 62, placed side by side with their centers of curvature at a distance from each other, produce a distortion of the picture in one direction during projection. This distortion is similar to the distortion introduced by an anamorphotic lens, and the two sections of the projection picture will thus show a gradually increasing distortion. In Figure 3 cylindrical half lenses 60, 62 with negative curvature are shown, while Figure 3a shows cylindrical half lenses with positive curvature. In the first case the distortion increases from the margin towards the center, in the second case the distortion increases from the center towards the margin. Which arrangement is preferred depends on the circumstances. In all cases the distortion must be corrected.

Figure 5:
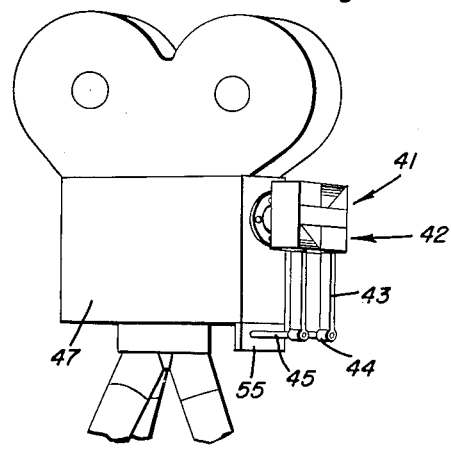
Figures 5 and 6 are perspective views diagrammatically illustrating the mounting of the attachment shown in Figure 4 on a camera and on a standard projector respectively.
Figure 9:
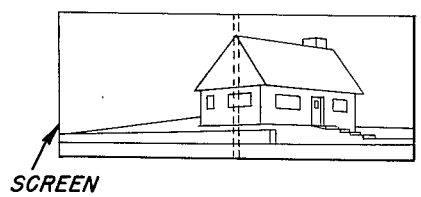
Figure 9 is a diagram illustrating the screen picture obtained with the simultaneous projection of the two sectional pictures juxtaposed on the standard film.
Figure 6:
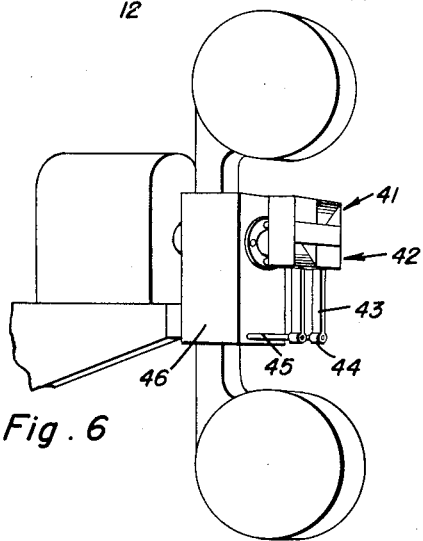

In order to produce an undistorted projection picture it is necessary to take the picture with a camera having an identical lens arrangement. Such a camera may be for instance one provided with an attachment 41 such as shown in Figure 5 the lens system of the attachment 41 having however a lens system 60, 62, shown in Figure 3 or 3a. This camera will produce a distorted, compressed or expanded picture which is then compressed or decompressed and restored to correct proportions by the compensating projection assembly shown in Figure 3 or 3a. Alternatively compression or expansion may be produced during the copying process of the film using an optical printer with lenses such as indicated.

On the curved projection screen 70 thus a substantially undistorted picture of maximum definition is obtained. In general it is preferable to use the system shown in Figure 3a, in which the center of the projection picture which is in most cases the center of attraction is left approximately undistorted.

In order to produce a film such as shown in Figure 7 a number of methods may be used. Methods to produce films with frames whose dimension of greatest length extends in the direction of movement of the film have been proposed and developed. Any one of these methods may be used in this case.

Most of these methods use a so-called optical printer, which produces a series of prints from the original film after turning the pictures around through 90°. The special method which is of particular advantage in connection with the film according to the invention consists in using as an original a 65 mm. or 75 mm. film, or any other film of larger than standard width, as illustrated in Figure 10. The width to height ratio of such an original picture may have the desired value of approximately 2.6:1.

To produce a film such as shown in Figure 7 an optical printer is used, and a little over one-half of each frame of the 65 mm. film or other wider film as indicated at 62, 64 is reduced to the proper size and printed on one-half of the standard (35 mm.) film, the printing being done after turning the picture through a right angle.

After the series of frame sections has been printed from a little over one-half of the 65 mm. film, the second series is then printed on the other half of the 35 mm. film using now the other half (and slightly more) of the 65 mm. frames and turning again, during printing, the pictures through 90°. The two frame sections which produce the wide angle screen picture are printed on the 35 mm. in juxtaposition as above described. As each frame section covers slightly more than one-half the pictures ovelap (as indicated at 50) when projected and the portions which are in excess of one-half of the 65 mm. frame may be used to carry the grey wedge which is applied to the standard film. The standard film may either be a positive or a dupe negative (with reversed grey wedge using a positive 65 mm. film).

From this dupe negative which will then be used as a master negative release prints can be made in the conventional manner.

With this method, using a large sized negative and reducing it in an optical printer, a definition of the photographic picture on the screen can be obtained which equals the definition obtained by a projection from a wider than standard film (such as 65 mm., 75 mm. film, etc.).

It will thus be seen that the method according to the invention permits to produce projection pictures on wide angle screens extending practically over any desired arc. The invention likewise permits to produce a high definition of the projection pictures on all types of projection screens, whether these screens are flat or curved. The method may be carried into effect using basically a single normal projection lens and a single beam between the light source and the projection lens, the beam of light being divided by means of lenses only after the beam has passed the projection lens.

The method according to the invention has a number of basic advantages, one of them being that composite projection pictures made by using for a single picture a pluraltiy of frames carried by one and the same film can be produced with standard projectors and practically also with standard cameras. The equipment necessary for producing the wide angle projection picture is essentially an addition to the normal projection lens and to the other equipment of the standard projector. Further very similar equipment is usable in the case of flat and of curved screens.

Another basic advantage of the method of making a composite projection picture from components which are essentially subjected to the same initial optical process consists in the fact that the component pictures are not distinguishable by differences of illumination on the screen.

A further basic advantage of the invention is that the projection picture is derivable from frames made by means of a wider than standard film which frames therefore, using step-reduction in an optical printer, may be produced with the definition of that film.

The invention thus permits to solve the problem of making composite projection pictures from a plurality of component frames which are projected on the screen practically by the same projection lamp and lens and therefore essentially by the same beam without loss of light, the quality of the projection picture thus being determined by the projection lens.

The invention, as has been explained in connection with Figure 1 may however also be used for the purpose of a superimposition of two projection pictures on the screen, which superimposition is essentially used in connection with stereoscopic pictures produced by polarized light and viewed through polarizing viewers.

It will be clear that instead of standard 35 mm. films also other films such as 16 mm. films may be used as a carrier for the two sectional pictures joined on the screen upon projection.

It will be clear to the expert in this field that the system according to the invention has been essentially outlined in such a manner only that changes in the equipment and to certain method steps may be made without in any way departing from the essence of the invention as defined in the annexed claims.

What is claimed as new is as follows:

1. A system of producing wide angle panoramic projected pictures consisting of a plurality of joined component pictures projected on an arcuate projection screen, comprising a light source; a film with two separate picture areas in each frame thereof, each picture containing a section of the scene photographed placed 90° from the scene's norm in head to tail relationship on the frame of the film, said film positioned to receive illumination on one side thereof from the light source; a single projection lens positioned on the other side of the film to receive the light transmitted through a frame of the film projecting a single beam forming an aerial image of both separate picture areas of a frame; an anamorphic lens arrangement consisting of two halves of an anamorphic lens which are positioned side by side with the widest portion of one half of the lens positioned at the bottom and the widest portion of the other half of the lens positioned at the top whereby each half is capable of distorting an aerial image along a vertical plane; two halves of the said anamorphic lens further positioned to receive the single beam from the projection lens in a manner so that only that portion of the beam carrying the aerial image of one picture area enters one half of the anamorphic lens and only that portion of the beam carrying the aerial image of the other picture area enters the other half of the anamorphic lens; two first deflecting means positioned to receive the beam from the anamorphic lens arrangement, each of the first deflecting means adapted to separately deflect horizontally and in a direction away from each other the portion of the beam emanating from each of the two halves of the anamorphic lens; secondary projection lens positioned in the path of each separately deflected beam; a second deflecting means positioned in the path of each separately deflected beam; the second deflecting means positioned in the path of one beam consisting of a first mirror deflecting one of the separately deflected beams 90° downwardly and further consisting of a second mirror deflecting the same beam 90° horizontally towards one section of an arcuate projection screen; the second deflecting means positioned in the path of the other beam consisting of a first mirror deflecting the other separately deflected beam 90° upwardly and further consisting of a second mirror deflecting the same beam 90° horizontally towards another section of an arcuate projection screen.

2. The system for producing wide angle panoramic projected pictures as claimed in claim 1 wherein the first deflection means consists of two mirrors; one mirror is at a 45° angle with respect to that portion of the beam emanating from one half of the anamorphic lens and the other mirror is at a 45° angle with respect to that portion of the beam emanating from the other half of the anamorphic lens.

References Cited in the file of this patent

UNITED STATES PATENTS

| | | |
|---|---|---|
| 1,321,906 | Gehrmann | Nov. 18, 1919 |
| 1,695,744 | Savage | Dec. 18, 1928 |
| 1,829,634 | Chretien | Oct. 27, 1931 |
| 1,906,215 | Nicolson | Apr. 25, 1933 |
| 1,964,968 | Warmisham | July 3, 1934 |
| 2,017,634 | Newcomer | Oct. 15, 1935 |
| 2,106,752 | Land | Feb. 1, 1938 |
| 2,207,409 | Newcomer | July 9, 1940 |
| 2,610,544 | Waller et al. | Sept. 16, 1952 |
| 2,792,746 | O'Brien | May 21, 1957 |

FOREIGN PATENTS

| | | |
|---|---|---|
| 2,703 | Australia | Dec. 24, 1931 |
| 23,396 | Great Britain | of 1907 |
| 204,141 | Great Britain | Sept. 27, 1923 |
| 346,454 | Great Britain | Apr. 9, 1931 |
| 416,074 | Great Britain | Sept. 10, 1934 |
| 768,243 | Great Britain | Feb. 13, 1957 |
| 1,090,497 | France | Oct. 20, 1954 |
| 1,136,355 | France | Dec. 29, 1956 |
| 450,536 | Italy | July 23, 1949 |